United States Patent [19]

Berghmans

[11] 4,223,069

[45] Sep. 16, 1980

[54] SUBSTRATE WITH MULTI-LAYER NONSTICK COATING

[75] Inventor: Jacques M. L. Berghmans, Lint, Belgium

[73] Assignee: E. I. Du Pont de Nemours and Company, Wilmington, Del.

[21] Appl. No.: 382

[22] Filed: Dec. 29, 1978

Related U.S. Application Data

[63] Continuation-in-part of Ser. No. 874,492, Feb. 2, 1978, abandoned.

[51] Int. Cl.² .................. B32B 5/30; B32B 15/08; A47J 37/01
[52] U.S. Cl. .................. 428/324; 220/454; 220/455; 220/456; 220/458; 428/328; 428/414; 428/416; 428/447; 428/450; 428/460; 428/524
[58] Field of Search .............. 427/410; 428/447, 416, 428/413, 414, 418, 450, 460, 524, 502, 504, 505, 379, 389, 391, 324, 328, 323, 404; 220/455, 454, 456, 458

[56] References Cited

U.S. PATENT DOCUMENTS

| 2,864,722 | 12/1958 | Millar | 428/418 |
|---|---|---|---|
| 2,995,467 | 8/1961 | Webber | 428/413 |
| 3,030,234 | 4/1962 | McClinton | 428/413 |
| 3,087,828 | 4/1963 | Linton | 106/291 |
| 3,087,829 | 4/1963 | Linton | 106/291 |
| 3,202,542 | 8/1965 | Poje | 428/447 |
| 3,505,099 | 4/1970 | Neuroth | 428/447 |
| 3,532,528 | 10/1970 | Bradshaw | 428/450 |
| 3,666,138 | 5/1972 | Morris | 428/416 |
| 3,687,879 | 8/1972 | Vasta | 428/447 |
| 3,749,593 | 7/1973 | Keiser | 428/447 |
| 4,028,339 | 6/1977 | Merrill | 428/447 |
| 4,046,937 | 9/1977 | McCaskey | 428/413 |
| 4,076,676 | 2/1978 | Sommerfeld | 427/410 |
| 4,105,613 | 8/1978 | Clope | 428/416 |

*Primary Examiner*—Ellis P. Robinson

[57] ABSTRACT

A three-coat system for use on bakeware which has a silvery appearance and can be cured at low temperatures. First, an epoxide-formaldehyde-nitrogen resin primer, which may contain aluminum flake, is applied to the substrate, then a reactive silicone-epoxy coat containing talc and coarse aluminum flake is applied. Finally, a less reactive silicone resin containing coarse aluminum flake, but no other pigment is applied. The two final coats are applied directly on the preceding coat after only ambient temperature air drying. After the final coat is applied, the coated article is baked at temperatures that need not exceed 275° C.

6 Claims, No Drawings

SUBSTRATE WITH MULTI-LAYER NONSTICK COATING

CROSS-REFERENCE TO RELATED APPLICATION

This application is a continuation-in-part of application Ser. No. 874,492—Berghmans, filed Feb. 2, 1978, now abandoned.

BACKGROUND OF THE INVENTION

Cookware is often coated with nonstick coatings. For high temperature top-of-the-range applications, fluorocarbon coatings are preferred. However, such coatings require relatively high baking temperatures with consequent high energy consumption, and need to utilize materials for the cookware substrate which will not warp or give off gases at the baking temperatures used.

Cookware intended for use in an oven, known as bakeware, need not be designed to withstand as high temperatures as top-of-the-range cookware. This permits more use of silicone or polysiloxane coatings. Such coatings, in comparison with fluorocarbon coatings, are often less durable and less adherent to the substrate.

Multi-layer coatings have been used for cookware coatings, especially for fluorocarbon coatings. There remains a need for bakeware coatings with superior durability, adherence and aesthetics, along with low-cost and low-energy requirements for applying the coatings.

SUMMARY OF THE INVENTION

The invention provides an article bearing a multi-layered coating comprising:
- a primer coat comprising an epoxide-nitrogen-formaldehyde resin and optionally aluminum flake,
- an intermediate coat comprising a polymethylphenylsiloxane resin derived from a cross-linkable precondensate having a silicon-bonded hydroxyl content of at least about 3%, preferably about 5%, based on the weight of the precondensate, an epoxy resin, talc, and aluminum flake, and
- a topcoat comprising a polymethylphenylsiloxane resin derived from a cross-linkable precondensate having a silicon-bonded hydroxyl content of about 2–4%, based on the weight of the precondensate, and aluminum flake.

Preferably, the epoxide-formaldehyde-nitrogen resin of the primer is the reaction product of an epoxy resin and a urea-formaldehyde resin wherein the epoxy resin is a condensation product of epichlorohydrin and bisphenol "A" having an epoxy equivalent weight of 1700–2500 and the urea formaldehyde resin has a combined molar ratio of urea:formaldehyde:butanol of about 1:2:1. (Percentages and proportions herein are by weight except when indicated otherwise.)

DETAILED DESCRIPTION OF THE INVENTION

The epoxide-formaldehyde-nitrogen resin primer of the invention provides good bonding to substrates of steel, tinplated steel, stainless steel and aluminum.

The reactive polysiloxane-epoxy intermediate coat containing aluminum flake provides desirable aesthetics and a good base for the topcoat which uses a less reactive but more elastic polysiloxane that would provide a less-durable coating without the intermediate coat. The talc can act as an extender but, combined with the aluminum flake, it also aids in reinforcing the intermediate coat. The appearance of coatings with coarse aluminum flake is less dulled by the talc than would be that of coatings with fine aluminum flake.

The elasticity of the topcoat makes it more resilient and less subject to deterioration of appearance as a result of use and abuse during cooking. The aluminum flake aids in distributing heat through relatively thick coatings and aids in bonding the intermediate and topcoat together. Flakes of metal other than or in addition to aluminum, such as stainless steel or nickel, may also be useful. In addition, titania-coated mica pigment can give desirable property and appearance effects, such as "Afflair" pigments, products of E. M. Laboratories, Inc., of Elmsford, New York, generally described in U.S. Pat. Nos. 3,087,828 and 3,087,829 - Linton (1963).

Preferred thicknesses are 5–8 microns ($\mu$m) for the primer, 15–20 $\mu$m for the intermediate coat, and 10–12 $\mu$m for the topcoat, for a total thickness of 30–40 $\mu$m.

In the epoxide-nitrogen-formaldehyde resin of the primer, it is desirable to use as the epoxide a condensation product of epichlorohydrin and bisphenol "A" such as Shell Oil Company's "Epon 1007" which has an epoxy equivalent weight of 1800–2400. Epoxy equivalent weight of 1700–2500 is desirable for use with the invention. Instead of urea-formaldehyde resin, one can use other nitrogen-formaldehyde resins such as melamine-formaldehyde or benzoguanamine-formaldehyde resins.

A suitable epoxide-nitrogen-formaldehyde resin is described in U.S. application Ser. No. 871,697, filed Jan. 23, 1978—Wald now abandoned.

A variety of epoxy resins can be used in the primer as well as in the intermediate coat.

The reactivity, hardness and durability of polysiloxane resins are determined by several factors. The silicon-bonded hydroxyl content of the precondensate is one important factor. A higher hydroxyl content causes more cross-linking and greater hardness in the resulting resin. Suitable polysiloxanes are described in U.S. application Ser. No. 829,824, filed Sept. 1, 1977—Vassiliou.

Preferably, the polysiloxane resins used herein are derived from a resin-forming precondensate having one or more of the units

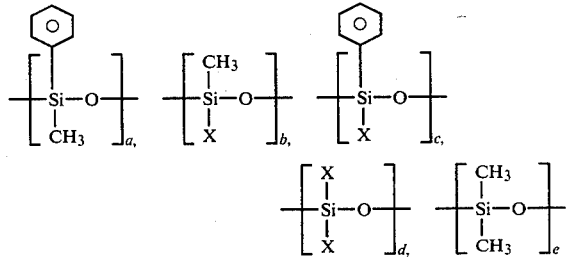

wherein
X is a functional group (preferably a hydroxyl group) which allows cross-linking at its site, and a, b, c, d and e are of a magnitude and in proportions which provide the resin with a degree of substitution, measured as the ratio of phenyl plus methyl groups to silicon atoms, of at least about 1.0, and a ratio of phenyl groups to silicon atoms of at least about 0.3.

Precondensates having a random arrangement of the repeating units in any order are, of course, included.

It is thought that the invention can use a broad variety of polysiloxane resins. Such resins are provided in coating compositions in the form of resin-forming precondensates of varying molecular weight containing functionality, generally silanol functionality, which causes cross-linking upon curing, such as by heat or catalysis, to form a rigid three-dimensional macropolymer matrix.

The precondensate will generally be of relatively low molecular weight, such as 1000 or 1100, and enough of the precondensate molecules will have three or more functional groups to cause the formation of a resin with a rigid, cross-linked, three-dimensional matrix upon condensation or curing. Preferably, the matrix of a polysiloxane resin will be hard and have a low degree of elongation, such as 2–4%, in contrast with elastomers which are soft and have a high degree of elongation, such as 30% or more. Typically, polysiloxanes to be used in the intermediate coat will have a pencil hardness of F at 25° C. and B at 260° C., while the softer polysiloxanes to be used in the topcoat will also have a pencil hardness of F at 25° C. but of 5B at 260° C.

Particularly useful in the topcoat of the present invention is Rhône-Poulenc's Rhodorsil resin 2104 which has a silcon-bonded hydroxyl content of about 2–4%, a ratio of phenyl groups to silicon of 0.4 and a ratio of methyl groups to silicon of 0.9.

Polysiloxane resins and resin-forming precondensates of the invention can be prepared by techniques known in the art. Generally, desired proportions of dimethyldichlorosilane, methylphenyldichlorosilane, and sometimes diphenyldichlorosilane are hydrolyzed to form cyclic structures, and then the cyclic structures are polymerized with acid or base to form the polysiloxane resin-forming precondensate. It is evident that appropriate proportions of the units selected for the structural formulas must be provided in order to achieve the ratios of the preferred compositions and in order to obtain the desired resin-forming precondensates. For instance, those skilled in the art would know that if a, b, c and e are each zero and the structure is made entirely of

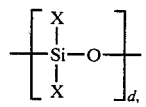

the resulting composition would be hydrated silicon dioxide which is not a resin-forming precondensate. Also if b, c and d were all zero and the resin were made entirely of

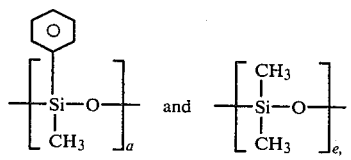

the result would be an elastomer rather than a resin.

The three coatings can also contain such conventional additives as flow control agents, surfactants, plasticizers, antioxidants, oxidation catalysts, colorants, etc., as are necessary or seem desirable. Such additives are used in nonstick coatings in accordance with customary practices by those skilled in the art.

The invention is illustrated by the following example.

EXAMPLE

The primer, intermediate and topcoat coating compositions are formulated by mixing the ingredients described below. Grinding is used to make dispersions used in the formulations. Colorants can be added to the intermediate coat for desired effects. The primer is applied by any suitable technique, such as spraying or brushing, and allowed to dry in air at ambient temperature (about 25° C.) for 5–7 minutes until it is tack-free, or it can be force-dried at 60°–80° C. for 1–2 minutes. Then the intermediate and topcoat compositions are similarly applied. After all three coatings are in place, the coated article is heated at low temperatures to cure the multi-layer coating. A suitable curing schedule is 10 minutes at 220° C., or 5 minutes at 250° C., or 20 minutes at 200° C., or 3–4 minutes at 275° C.

| | Parts by Weight |
|---|---|
| PRIMER | |
| Epon 1007 - solution in xylene and methyl isobutyl ketone (epoxy equivalent weight 1800–2400) | 33.91 |
| Diacetone alcohol | 20.59 |
| Urea-formaldehyde resin | 4.58 |
| Carbon black - dispersion in melamine formaldehyde and butyl carbitol | 6.15 |
| Hydrocarbon solvent - BP 150°–190° C. | 12.93 |
| Xylene | 2.02 |
| Butyl acetate | 17.60 |
| Fine aluminum flake - particle size - median 7 μm - Alcoa 1593 paste | 1.32 |
| INTERMEDIATE COAT | |
| Reactive polymethylphenylsiloxane resin, 5% OH - Dow Corning 6-2230 or Rhone-Poulenc Rhodorsil 6352E | 35.13 |
| Xylene | 5.58 |
| Butyl acetate | 9.05 |
| Cellosolve acetate | 5.14 |
| Methyl isobutyl ketone | 2.24 |
| Talc - millbase containing 34.5% laminar IT Extra Micro Talc - Norwegian Talc Company - particle size median 2–4 μm dispersed in above siloxane and solvents | 27.47 |
| Mica flake coated with titania Afflair ® pigment - E. M. Laboratories, Inc. | 0.85 |
| Epon 828 (epoxy equivalent weight 180) | 4.50 |
| Zinc octoate - solution in mineral spirits containing 12% Zn$^{+2}$ | 0.51 |
| Coarse bright aluminum flake - particle size - median 40–44 μm Silberline SS-3166-ER | 4.58 |
| TOPCOAT | |
| Polymethylphenylsiloxane resin 35.5% solution in xylene, glycol and n-butanol, 2% OH containing iron octoate catalyst - Dow Corning DCR-9503 | 99.75 |
| Coarse bright aluminum flake Silberline SS-3166-ER | 0.25 |
| - or - | |
| Polymethylphenylsiloxane resin 60% solution in xylene, glycol and n-butanol, 2–4% OH - Rhone-Poulenc Rhodorsil 2104 with added iron octoate, cerium octoate or zirconium octoate catalyst | 99.50 |
| Coarse bright aluminum flake Silberline SS-3166-ER | |

What is claimed is:

1. An article suitable for use as bakeware comprising a heat-resistant substrate coated with a multi-layered coating comprising:
   a primer coat comprising an epoxide-formaldehyde-nitrogen resin and optionally aluminum flake,
   an intermediate coat comprising a polymethylphenylsiloxane resin derived from a cross-linkable precondensate having a silicon-bonded hydroxyl content of at least about 3%, based on the weight of the precondensate, an epoxy resin, talc, and aluminum flake, and
   a topcoat consisting essentially of a polymethylphenylsiloxane resin derived from a cross-linkable precondensate having a silicon-bonded hydroxyl content of about 2 to 4%, based on the weight of the precondensate, and aluminum flake.

2. The article of claim 1 wherein the epoxide-formaldehyde-nitrogen resin of the primer is the reaction product of an epoxy resin and a urea-formaldehyde resin wherein the epoxy resin is a condensation of epichlorohydrin and bisphenol "A" having an epoxy equivalent weight of 1700–2500 and the urea formaldehyde resin has a combined molar ratio of urea:formaldehyde:butanol of about 1:2:1.

3. The article of claim 1 wherein the polymethylphenylsiloxane resin of the intermediate coat has a hydroxyl content of about 5%.

4. The article of claim 1 wherein the topcoat does not contain any pigment other than aluminum flake.

5. The article of claim 1 wherein the epoxide-formaldehyde-nitrogen resin of the primer is the reaction product of an epoxy resin and a urea-formaldehyde resin wherein the epoxy resin is a condensation product of epichlorohydrin and bisphenol "A" having an epoxy equivalent weight of 1700–2500 and the urea formaldehyde resin has a combined molar ratio of urea:formaldehyde:butanol of about 1:2:1; the polymethylphenylsiloxane resin of the intermediate coat has a hydroxyl content of about 5%; and the topcoat does not contain any pigment other than aluminum flake.

6. The article of claim 1 wherein the intermediate coat also contains titania-coated mica pigment.

* * * * *